US010150267B2

(12) United States Patent
Tucker

(10) Patent No.: US 10,150,267 B2
(45) Date of Patent: *Dec. 11, 2018

(54) PRODUCT SUCH AS A TIRE WITH RFID TAG WITH RUBBER, ELASTOMER, OR POLYMER ANTENNA

(71) Applicant: COOPER TIRE & RUBBER COMPANY, Findlay, OH (US)

(72) Inventor: Randall L. Tucker, Findlay, OH (US)

(73) Assignee: COOPER TIRE & RUBBER COMPANY, Findlay, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/645,610

(22) Filed: Jul. 10, 2017

(65) Prior Publication Data
US 2017/0305088 A1    Oct. 26, 2017

Related U.S. Application Data

(63) Continuation of application No. 14/442,034, filed as application No. PCT/US2013/069898 on Nov. 13, 2013, now Pat. No. 9,701,080.
(Continued)

(51) Int. Cl.
*G06K 19/06* (2006.01)
*B29D 30/00* (2006.01)
(Continued)

(52) U.S. Cl.
CPC ........... *B29D 30/0061* (2013.01); *B60C 5/00* (2013.01); *B60C 23/0452* (2013.01);
(Continued)

(58) Field of Classification Search
CPC ........... G06K 19/07749; G07F 7/1008; G06Q 20/341
(Continued)

(56) References Cited

U.S. PATENT DOCUMENTS 8,661,885 B1    3/2014  Singh et al.
9,701,080 B2 *  7/2017  Tucker ............... B29D 30/0061
(Continued)

FOREIGN PATENT DOCUMENTS

EP           2420957 B1    2/2012
WO     WO 2004/016454 A1  2/2004

OTHER PUBLICATIONS

PCT/US2013/069898, "International Search Report and Written Opinion", dated Feb. 6, 2014.
(Continued)

*Primary Examiner* — Ahshik Kim
(74) *Attorney, Agent, or Firm* — Fay Sharpe LLP

(57) ABSTRACT

A product such as a tire includes a radio frequency identification device (RFID) assembly located along an outer sidewall. The RFID assembly has a thin, flexible, substantially planar, elongated non-conductive rubber, elastomer, or polymer substrate. First and second thin, flexible, elongated, substantially planar first antenna portions formed at least in part of the same conductive rubber, elastomer, or polymer are provided on the substrate. Opposite first and second ends of the first antenna portion have different first and second widths. A chip has opposite first and second ends in operative electrical connection with the first and second antenna portions, respectively, and is located between the outer sidewall and the substrate.

18 Claims, 2 Drawing Sheets

Related U.S. Application Data

(60) Provisional application No. 61/725,814, filed on Nov. 13, 2012.

(51) Int. Cl.
*G06K 19/077* (2006.01)
*B60C 5/00* (2006.01)
*B60C 23/04* (2006.01)
*H01Q 1/22* (2006.01)
*H01Q 9/28* (2006.01)

(52) U.S. Cl.
CPC ...... *B60C 23/0493* (2013.01); *G06K 19/0779* (2013.01); *G06K 19/07764* (2013.01); *G06K 19/07786* (2013.01); *H01Q 1/2225* (2013.01); *H01Q 1/2241* (2013.01); *H01Q 9/28* (2013.01); *B29D 2030/0066* (2013.01); *B29D 2030/0077* (2013.01); *Y10T 29/4902* (2015.01); *Y10T 152/10495* (2015.01)

(58) Field of Classification Search
USPC .......................................................... 235/492
See application file for complete search history.

(56) References Cited

U.S. PATENT DOCUMENTS

| | | |
|---|---|---|
| 2007/0211398 A1 | 9/2007 | Whitney |
| 2008/0278288 A1 | 11/2008 | O'Brien |
| 2009/0128289 A1 | 5/2009 | Rossman |
| 2011/0017832 A1 | 1/2011 | Ritamaki et al. |
| 2011/0198402 A1 | 8/2011 | Tucker |
| 2015/0075693 A1 | 3/2015 | Dorfi et al. |

OTHER PUBLICATIONS

EP 13854320 Supplementary European Search Report, dated Jun. 9, 2016.

* cited by examiner

PRODUCT SUCH AS A TIRE WITH RFID TAG WITH RUBBER, ELASTOMER, OR POLYMER ANTENNA

This application claims the priority benefit of U.S. Ser. No. 14/442,034, filed May 11, 2014 which is a submission under 35 U.S.C 371 of PCT/2013/069898 (International Filing Date 13 Nov. 2013), which claimed the priority benefit of U.S. provisional application Ser. No. 61/725,814, filed Nov. 13, 2012, the disclosures of which are expressly incorporated herein by reference.

BACKGROUND

This disclosure is related to rubber, elastomer, or polymer products, and more particularly to a tire that incorporates a radio frequency identification device (RFID) tag or assembly, and a manufacturing method that incorporates a RFID tag or assembly in the product or tire, and will be described with respect thereto. Selected aspects of this disclosure, however, may find application in related environments and applications.

Manufacturers believe that incorporating a RFID tag into a product such as a tire would provide significant benefits. For example, if the RFID tag could be effectively molded into the product, then the manufacturing quality of the product could be improved. Specifically, during manufacture, removing variability in manufacturing one product to the next, or tightening tolerances during the manufacturing process, could be achieved. One example of how manufacturing could be improved is to incorporate the RFID tag early in the manufacturing process. This requires the RFID tag to be able to withstand high temperatures, for example, associated with curing or vulcanization. Use of an insulating material that encapsulates the RFID chip, die, or electronic component has allowed the tag to survive the curing process.

Another problem was to reduce the size of the RFID tag. If the RFID tag were too big, the tag would constitute too great a percentage of foreign material. Unfortunately, reducing the size of the tag had the adverse effect of limiting the read range associated with the RFID tag. Consequently, if the RFID tag were reduced in size, and made sufficiently durable, antennas were needed to assure that a sufficient read range were achieved.

One way to reduce the issue of foreign material was to replace a copper or conductive metal used as antenna with a conductive rubber, elastomer, or polymer material, sometimes referred to hereafter as a conductive polymer material. The conductive polymer material provided flexibility and reduced fatigue factor otherwise associated with metallic antennas. Further, the conductive polymer material exhibited very similar properties to the polymer that is typically used in the product, such as the sidewall construction of tires.

A RFID electronic die or chip is encapsulated in heat resistive embodiments. The RFID chip preferably included first and second protruding metallic antenna connection points. These first and second connection points provided a mechanical and electrical interface to the conductive polymer antenna, thereby completing the electronic portion of the RFID tag. The remainder of the design of the tag is typically focused on incorporating the RFID tag into the manufacture of the product. For example in the manufacture of a tire preferably the RFID tag is used at a desired radial location, sometimes referred to as the "home position" in the green tire. Each tire carcass and each tire assembly process incorporates the RFID tag in the home position. All steps of the production process used to build and test the green tire can thus be made more accurately and with less variation. For example, the RFID tag incorporated in the green tire reduces variability associated with a machine operator and thus results in a consistent, repeatable, and improved overall product quality. Some of these same manufacturing benefits can be achieved with other products.

Improving quality is just one benefit associated with incorporating the RFID tag into the product. Another benefit associated with a RFID tag incorporated in the product is associated with storage or warehousing of the products. If a suitable read range can be attained, inventory control can be significantly improved. Likewise, data can be more easily collected from a product in use if the read range is maximized.

Accordingly, flexibility is required to accommodate or incorporate different chip structures into the RFID tag, and there is also a need to maximize the read range of the product that includes an RFID tag.

SUMMARY

First and second antenna portions are each formed at least in part of a conductive rubber, elastomer, or polymer. Each antenna portion has different widths at first and second ends, and the antenna portions are preferably located on the non-conductive substrate in spaced relation. A chip has opposite first and second ends in operative electrical connection with the first and second antenna portions.

In one embodiment, a tire includes a tread portion that extends between inner and outer rubber sidewalls. A radio frequency identification device (RFID) tag or assembly is located in a sidewall and preferably located along the outer sidewall. The RFID assembly includes a non-conductive rubber substrate. First and second antenna portions are each formed at least in part of a conductive rubber. Each antenna portion has different widths adjacent first and second ends, and the antenna portions are preferably located on the substrate in spaced relation. A chip has opposite first and second ends in operative electrical connection with the first and second antenna portions.

The first and second antenna portions each having a tapering portion between the first and second ends that extends over at least an axial extent thereof.

Each tapering portion of the first and second antenna portions preferably extends from the first end toward the second end over only a minor portion of the respective antenna portion.

In one embodiment, a cover member formed of a non-conductive rubber is dimensioned to overlie the first and second antenna portions, the chip, and at least a portion of the substrate, with the cover member located between the antenna portions and the outer sidewall.

A method of manufacturing a product includes providing a non-conductive rubber substrate, and locating first and second antenna portions formed at least in part of a conductive rubber on the substrate where the antenna portions are positioned between the substrate and an outer surface of the product. The method further includes mechanically and electrically connecting first and second ends of the chip with the first and second antenna portions, respectively, and locating the chip between the outer surface and the substrate.

A method of manufacturing a tire that includes a RFID assembly includes providing a tread portion spanning between inner and outer rubber sidewalls. The method includes locating a RFID assembly along the outer sidewall. The method further includes providing a non-conductive rubber substrate, and locating first and second antenna portions formed at least in part of a conductive rubber on the substrate where the antenna portions are positioned between the substrate and the outer sidewall. The method further includes mechanically and electrically connecting first and second ends of the chip with the first and second antenna portions, respectively, and locating the chip between the outer sidewall and the substrate.

In one embodiment, a cover member is located over the first and second antenna portions, and disposed between the antenna portions and the outer sidewall.

A primary benefit is the ability to incorporate an RFID assembly into a product such as a tire with improved read range for the antenna.

Another advantage resides in the ability to pre-assemble the RFID tag or assembly, and subsequently locate the assembled RFID tag on the outer sidewall of the tire during the green stage manufacturing process.

Still another benefit resides in the ability to reduce the size of the RFID chip, without adding an undue amount of undesired foreign material into the product construction while still retaining an effective read range of the antenna.

Yet another advantage is associated with the conductive rubber having many similar qualities to the rubber of the tire sidewall.

Still other benefits and advantages of the present disclosure will become apparent upon reading and understanding the following detailed description.

DETAILED DESCRIPTION

Figure 1:
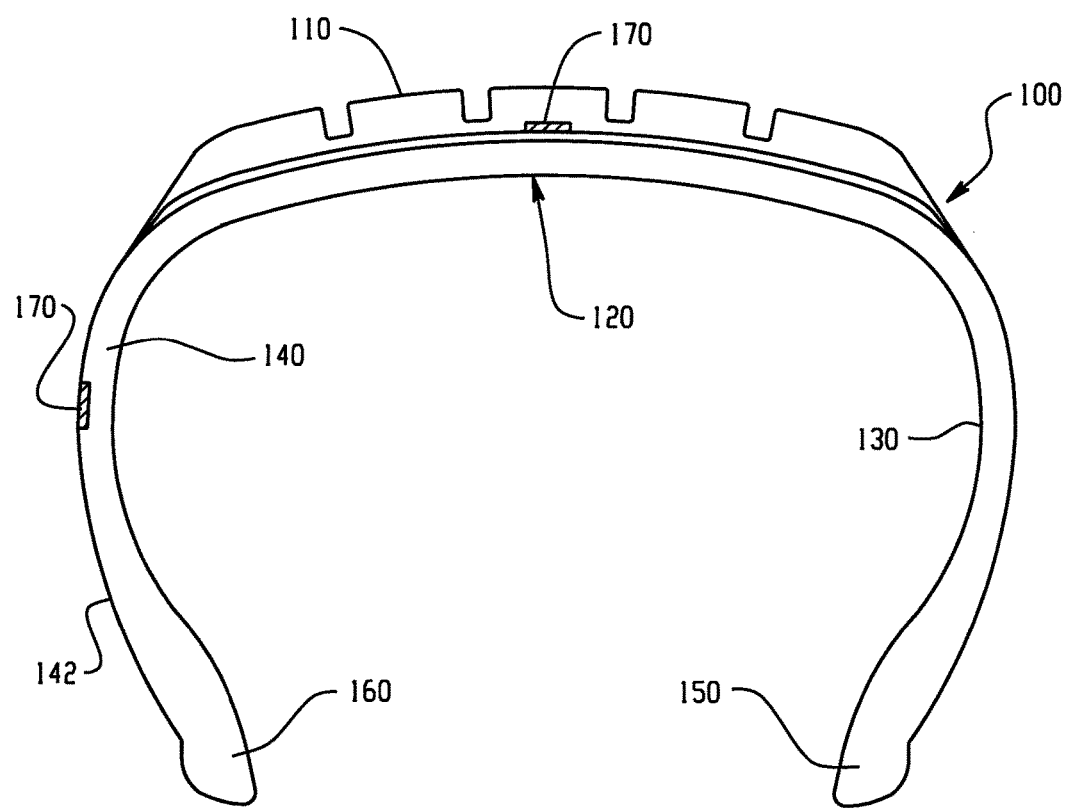
FIG. 1 is a cross-sectional view of a product such as a tire that includes a RFID tag in accordance with the present disclosure.
Figure 2:
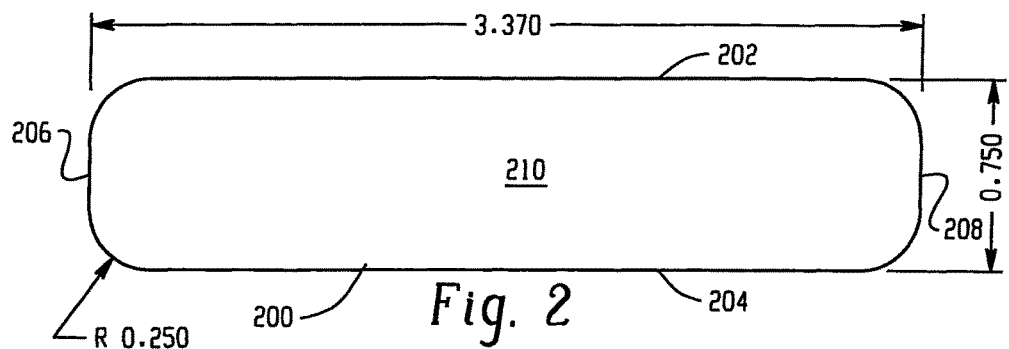
FIG. 2 is a plan view of a first layer or substrate of the RFID tag.

Turning first to FIG. 1, a product such as a rubber tire 100 is shown and includes a tread portion 110 received on a crown 120 disposed between a first or inner sidewall 130 and a second or outer sidewall 140. Beads 150, 160 are provided along inner diameter edges of the respective sidewalls 130, 140 for cooperation with a wheel rim (not shown). One skilled in the art will appreciate that the tire may have one of various tread patterns on tread portion 110, and/or incorporate various belts, cords, or strengthening members in the crown or sidewall portions in order to satisfy various desired functions of the tire. Generally, none of these variations are outside the scope of the present disclosure.

A radio frequency identification device (RFID) assembly or tag 170 is included in a desired location in the product such as tire 100. With respect to use of the RFID tag used in a tire, one preferred location for the RFID tag 170 is in the outer sidewall 140 of the tire 100. Preferably, and as noted in the Background, it is desirable to incorporate the RFID tag into the tire in early stages of the tire building process, i.e. preferably into the green tire. To achieve this, it became necessary to use an insulating material to encapsulate the electronic component or RFID die. By using a conductive rubber material in place of metals, such as copper or other conductive materials, greater flexibility was achieved and this also addressed the issues associated with introduction of foreign material into the tire. That is, it was also desirable to minimize the size of the RFID tag so that a minimal amount of "foreign material" was included in the rubber tire. Each of these design criteria, however, had a generally adverse impact on the read distance of the RFID tag.

An improved tire 100 with a flexible RFID tag having increased read range or read distances is more particularly shown in FIGS. 2-5. A first layer or substrate 200 is individually shown in FIG. 2. Preferably, the substrate 200 is a thin, flexible, substantially planar, elongated structure such as a nonconductive material such as a nonconductive rubber, elastomer, or polymer. In the illustrated embodiment, the substrate has longitudinal edges 202, 204 that extend between opposed first and second ends 206, 208. The material (e.g. rubber) used to form the nonconductive substrate preferably has similar properties to the material of the final product. For example, the rubber used to form substrate 200 preferably has similar properties to the rubber of the tire so that if a completed tire is cut, little or no differentiation in the rubbers of the substrate and sidewall 140 is detectable.

Without limiting the present disclosure, stock material used to form the substrate 200 has a thickness on the order of 0.03 inches to provide the desired thin, flexible nature of the substrate, and depending on the end use of the product, other thicknesses may be desired. Substrate 200 also has a generally constant thickness throughout its cross-section and the substrate is generally planar. The substrate 200 is preferably elongated, e.g. the substrate has a length of approximately four times (4×) the width. That is, longitudinal edges 202, 204 each have a dimension approximately four times the width dimension of opposite ends 206, 208. Again, without limiting the present disclosure, in one preferred embodiment the substrate 200 has a width of approximately 0.75 inches and a length of approximately 3.37 inches. To minimize sharp edges where the substrate 200 merges into the remainder of the tire sidewall 140, the substrate preferably has radiused or rounded corners.

Figure 3:
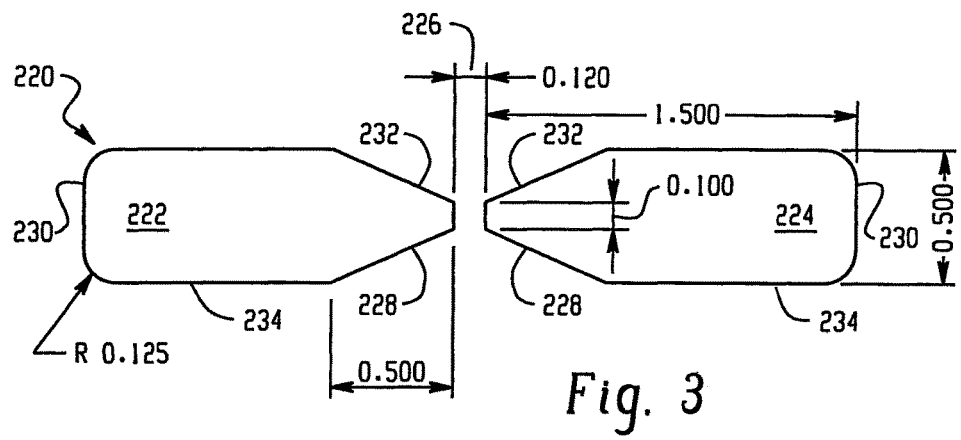
FIG. 3 is a plan view of the antenna of the RFID tag of the present disclosure.

FIG. 3 shows an antenna 220 that is received on first or upper surface 210 of the substrate 200. The antenna 220 is preferably formed of a conductive rubber and more particularly includes first and second antenna portions 222, 224. The first and second antenna portions 222, 224 are disposed in end-to-end relation. More specifically, the antenna portions 222, 224 are disposed in adjacent, spaced relation with a small gap or space 226 between the inner ends of the antenna portions. Each antenna portion 222, 224 in a first preferred arrangement has a first or inner end 228 that has a first or small dimension and a distal or outer end 230 that has a second or larger dimension. Preferably the width of each antenna portion increases in dimension from the first end 228 in a generally constant taper 232 that preferably extends over only a minor portion of the overall length of each antenna portion 222, 224. Once the taper reaches the larger dimension of the outer end 230, the antenna portion has a generally constant width 234 through the remainder of its longitudinal extent. Of course, alternative configurations or shapes that alter the dimension between the first and second ends are also contemplated if such designs achieve the desired operational parameters of the antenna in the final environment.

In the preferred arrangement, each antenna portion 222, 224 has a longitudinal length of approximately 1.5 inches, a width of approximately 0.5 inches, and a thickness of approximately 0.03 inches. With a gap of approximately 0.12 inches between the first ends 228 of the respective antenna portions, the overall length of the antenna is therefore approximately 3.12 inches. Again, these are representative dimensions only and are presented here to provide an indication of the dimensions of the antenna portions relative to the substrate 200 on which the antenna portions are received. Like the substrate, the ends 230 of each antenna portion preferably have radiused or rounded corners.

The conformation of the conductive rubber antenna portions 222, 224 is conducive to forming a dipole antenna arrangement. The antenna portions 222, 224 form a generally bow-tie configuration that improves the read range distance by approximately 3 feet over prior arrangements. That is, the distance at which the RFID assembly can be sensed for reading and communication purposes is significantly improved with this bow-tie configuration. The dipole-type arrangement improves the total radiated power and radiation resulting in a significant improvement over prior arrangements. Ideally, a half-wavelength dipole is provided by the antenna where each antenna portion forms one-quarter of a wavelength.

Figure 4:
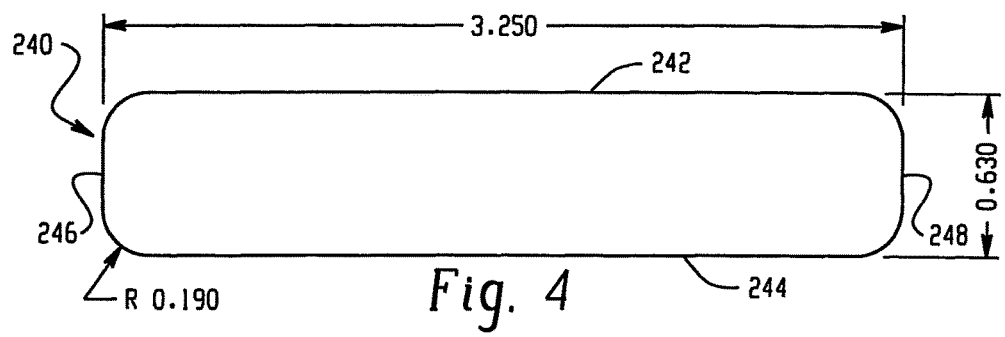
FIG. 4 is a plan view of a cover member of the RFID tag used in an alternate embodiment of the present disclosure.
Figure 5:
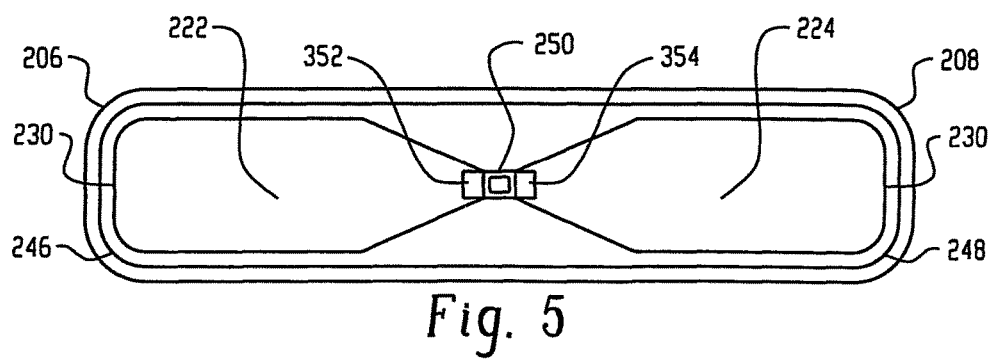
FIG. 5 is a plan view of the assembled RFID tag.

FIG. 4 illustrates an optional cover member 240 formed of a non-conductive rubber. More specifically, the antenna portions 222, 224 are disposed on the substrate 200 in the desired end-to-end relation with the gap 226 formed between the first ends 228 of the respective antenna portions. An RFID chip or die 250 (FIG. 5) preferably has first and second conductive ends 252, 254 at opposite ends that are mechanically and electrically connected to the respective antenna portions 222, 224. In some instances, an outer surface 142 of the outer sidewall 140 of the tire 100 may serve to adequately complete the encapsulation of the antenna 220 and RFID chip 250 with the substrate 200. In other instances, and to facilitate assembly of the RFID tag separate from the tire before the RFID tag is positioned on the outer surface 142 of the tire outer sidewall 140, a cover member 240 may be placed over the substrate 200, over the antenna portions 222, 224, and over the RFID chip 250, thereby encapsulating the antenna 220 and the RFID chip 250 from the elevated temperatures associated with the tire curing process. Although it is preferred to mount the RFID tag at a desired location along the outer surface of the outer sidewall, one skilled in the art will appreciate that alternative mounting locations for the RFID tag (e.g., along the inner surface of the outer sidewall, or beneath the tread portion, etc.) may be used without departing from the scope and intent of the present disclosure. For reasons previously noted, such as improved quality control during manufacture, the RFID tag is positioned at a same desired mounting location in each product. In this manner, the product can be oriented in precise manner during manufacture, the manufacturing processes carried out more precisely, consistently, etc. and any associated sensors or readers can be ideally positioned in the manufacturing environment to maximize readability of the RFID tag.

Again for exemplary purposes only and not deemed to be limiting the present disclosure, in a preferred arrangement the cover member 240 has a width of approximately 0.63 inches and an overall length of approximately 3.25 inches. The cover member 240 likewise is preferably formed of a nonconductive rubber stock material having a thickness of approximately 0.03 inches. This dimensioning of the cover member 240 (i.e., dimension of elongate edges 242, 244 and dimensions of ends 246, 248) is such that the cover member completely covers the antenna 220 and chip 250 once these components are located on the substrate 200, and the overall footprint or peripheral dimension of the cover member is slightly smaller than the substrate in order to reduce the step-off dimensions. That is, by gradually stepping down the peripheral dimensions of the respective layers of the RFID tag, when the tag is incorporated into the sidewall 140 of the tire, there is less chance of cracking along the tire. In this manner, the antenna and RFID chip are positioned between the substrate and the outer surface of the sidewall. If the cover member is used, the cover member is likewise situated between the antenna and the outer surface of the sidewall.

The disclosure has been described with reference to the preferred embodiments. Modifications and alterations will become apparent to those skilled in the art and the present disclosure are deemed to encompass such modifications and alterations insofar as they come within the scope of the following claims.

What is claimed is:

1. A polymer product comprising:
    a radio frequency identification device (RFID) assembly located along a sidewall, the RFID assembly including:
    a thin, flexible, substantially planar, elongated non-conductive rubber substrate;
    a thin, flexible, elongated, substantially planar first antenna portion formed at least in part of a conductive rubber, opposite first and second ends of the first antenna portion having different first and second widths, and the first antenna portion located between the substrate and the sidewall;
    a thin, flexible, elongated, substantially planar second antenna portion formed at least in part of a conductive rubber, opposite first and second ends of the second antenna portion having different first and second widths, and the second antenna portion located between the substrate and the sidewall with the respective first ends of the first and second antenna portions disposed in adjacent, spaced relation to one another; and
    a chip having opposite first and second ends in operative electrical connection with the first and second antenna portions, respectively, and located between the sidewall and the substrate.

2. The polymer product of claim 1 wherein the first and second antenna portions each have a tapering portion between the first and second ends that extends over at least an axial extent thereof.

3. The polymer product of claim 2 wherein each tapering portion extends from the first end toward the second end over only a minor portion of the axial extent of each of the first and second antenna portions.

4. The polymer product of claim 1 wherein an outer perimeter of the first and second antenna portions are located inwardly from an outer perimeter of the substrate.

5. The polymer product of claim 1 wherein each antenna portion has a generally planar, elongated conformation of a minimal height dimension compared to length and width dimensions thereof, and the first and second antenna portions are disposed in end-to-end relation.

6. The polymer product of claim 5 wherein the first ends have a smaller width than the second ends of the first and second antenna portions, the first ends of the first and second antenna portions are located in adjacent, spaced relation, and the chip first and second ends operatively engaging the first ends of the first and second antenna portions, respectively.

7. The polymer product of claim 6 wherein the larger dimension second ends of the first and second antenna portions have a substantially constant width.

8. The polymer product of claim 1 wherein the first and second antenna portions together form a substantially bowtie conformation.

9. A radio frequency identification device (RFID) assembly comprising:
- a non-conductive rubber substrate;
- a first antenna portion formed at least in part of a conductive rubber and secured to the substrate, the first antenna portion having a reduced dimension first region and a larger dimension second region;
- a second antenna portion formed at least in part of a conductive rubber and secured to the substrate in spaced arrangement from the first antenna portion, the second antenna portion having a reduced dimension first region and a larger dimension second region; and
- a chip having opposite first and second ends interconnecting with the first and second antenna portions, respectively.

10. The assembly of claim 9 wherein the first antenna portion and the second antenna portion have substantially mirror image configurations.

11. The assembly of claim 9 wherein the chip first end is mechanically and electrically connected to the first region of the first antenna portion, and the chip second end is mechanically and electrically connected to the first region of the second antenna portion.

12. The assembly of claim 9 wherein each antenna portion has a generally planar, elongated conformation of a minimal height dimension compared to length and width dimensions thereof, and the first and second antenna portions are disposed in end-to-end relation.

13. The assembly of claim 12 wherein each antenna portion is thin, flexible, substantially planar, and elongated.

14. A method of making a radio frequency identification device (RFID) assembly comprising:
- providing a non-conductive rubber substrate;
- forming at least a part of a first antenna portion of a conductive rubber and securing the first antenna portion to the substrate, the first antenna portion having a reduced dimension first region and a larger dimension second region;
- forming at least a part of a second antenna portion of a conductive rubber and securing the second antenna portion to the substrate in spaced arrangement from the first antenna portion, the second antenna portion having a reduced dimension first region and a larger dimension second region; and
- interconnecting opposite first and second ends of a chip with the first and second antenna portions, respectively.

15. The method of claim 14 further comprising forming the first antenna portion and the second antenna portion as substantially mirror image configurations.

16. The method of claim 14 further comprising mechanically and electrically connecting the chip first end to the first region of the first antenna portion, and mechanically and electrically connecting the chip second end to the first region of the second antenna portion.

17. The method of claim 14 further comprising forming each antenna portion as a generally planar, elongated conformation of a minimal height dimension compared to length and width dimensions thereof, and disposing the first and second antenna portions in end-to-end relation.

18. The method of claim 17 further comprising forming each antenna portion as a thin, flexible, substantially planar, and elongated structure.

* * * * *